United States Patent [19]

Bagrel et al.

[11] Patent Number: 5,019,643

[45] Date of Patent: May 28, 1991

[54] PROCESS FOR CONDENSING AT LEAST ONE EPOXIDE ON AT LEAST ONE CYCLIC ANHYDRIDE IN THE PRESENCE OF A CATALYST CONSISTING OF AT LEAST ONE TITANIUM COMPLEX

[75] Inventors: Valérie Bagrel, Fontenay-aux-Roses; Jacques Garapon, Lyons; Rémi Touet, Saint Egreve; Catherine Huet, Chalon sur Saone; Bernard Damin, Oullins, all of France

[73] Assignees: Institut Francais du Petrole, Rueil Malmaison; L'Air Liquide Societe Anonyme pour L'Etude et L'Exploitation des Procedes Georges Claude, Paris; ELF France, Courbevoie, all of France

[21] Appl. No.: 492,042

[22] Filed: Mar. 12, 1990

[30] Foreign Application Priority Data

Mar. 10, 1989 [FR] France .................................. 89 03139

[51] Int. Cl.$^5$ ............................................. C08G 63/42
[52] U.S. Cl. ........................................ 528/361; 528/92; 528/365; 528/366

[58] Field of Search ................... 528/92, 361, 365, 366

[56] References Cited

U.S. PATENT DOCUMENTS

| 3,424,699 | 1/1969 | Stark et al. | 528/92 X |
| 3,776,978 | 12/1973 | Markovitz | 528/92 X |
| 3,812,214 | 5/1974 | Markovitz | 528/92 |
| 4,085,250 | 4/1978 | Smith | 528/92 X |
| 4,237,242 | 12/1980 | Frankel | 528/92 X |
| 4,297,457 | 10/1981 | Stark | 528/92 X |

*Primary Examiner*—Earl Nielsen
*Attorney, Agent, or Firm*—Millen, White & Zelano

[57] ABSTRACT

A process for condensing at least one aliphatic epoxide having at least 8 atoms of carbon in its molecule on at least one cyclic anhydride of a dicarboxylic acid in the presence of a catalyst consisting of at least one titanium complex of general formula (I) $Ti(OR)_2(L)_2$ in which each R group independently represents one hydrocarbon group with 1 to 10 atoms of carbon and each L group represents a ligand of the diketonic beta type or of the keto-ester beta.

19 Claims, 2 Drawing Sheets

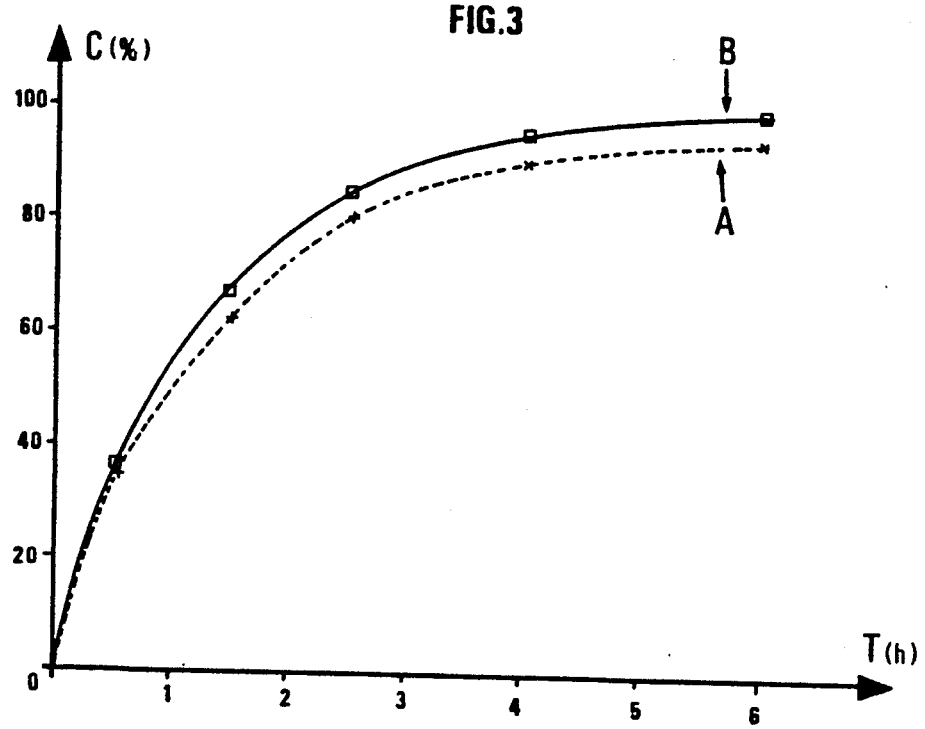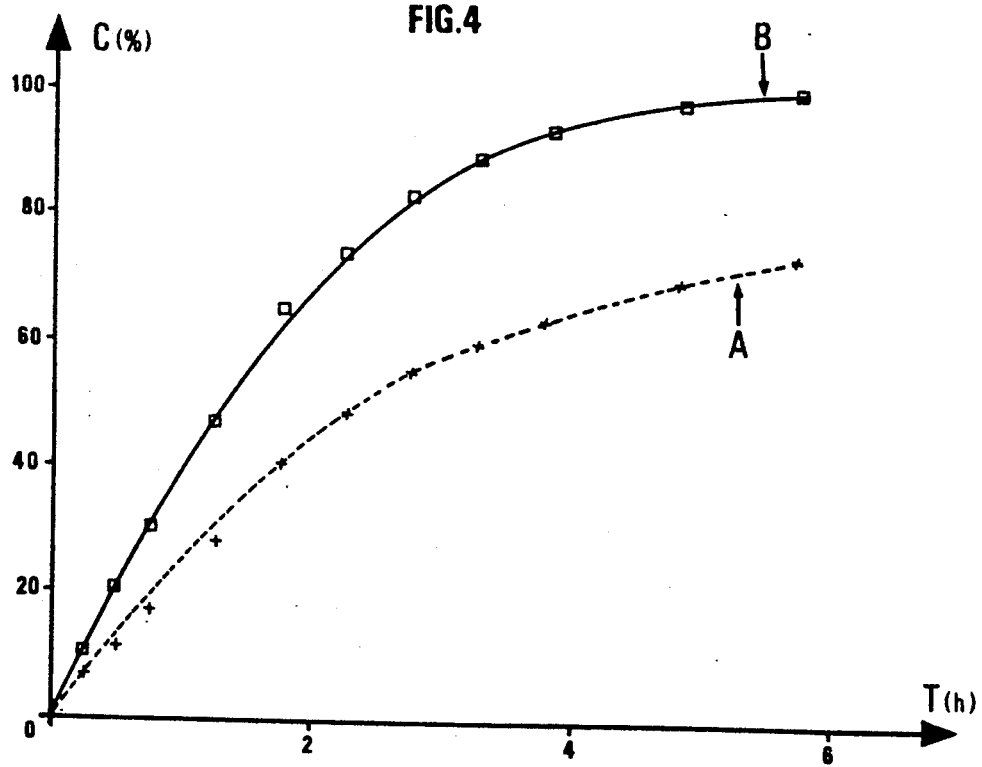

PROCESS FOR CONDENSING AT LEAST ONE EPOXIDE ON AT LEAST ONE CYCLIC ANHYDRIDE IN THE PRESENCE OF A CATALYST CONSISTING OF AT LEAST ONE TITANIUM COMPLEX

OBJECT OF THE INVENTION

The present invention relates to a process for condensing at least one aliphatic epoxide having at least 8 atoms of carbon in its molecule on at least one cyclic anhydride of a dicarboxylic acid in the presence of a catalyst consisting of at least one titanium complex.

The object of the present invention is also a process for producing a condensation copolymer comprising "hanging" side chains, showing a regular alternation of each type of reacted compound and resulting from the condensation of at least one aliphatic epoxide with at least 8 atoms of carbon in its molecule on at least one cyclic anhydride of a dicarboxylic acid.

This type of condensation or polyesterification is different from the conventional process involving a dihydroxyl compound (or diol) and an anhydride or a dicarboxylic acid, particularly by the fact that the polycondensation temperature does generally not exceed about 150° C. and especially by the fact that no volatile matter is released during the reaction.

BACKGROUND OF THE INVENTION

The condensation between an epoxide (or an epoxide derivative) and a cyclic anhydride of a dicarboxylic acid has given rise to numerous works which have for example been summarized by LUSTON and VASS (Advances in Polymer Sciences 1984, Vol. 56, p. 91 and following pages) or by ISHII and SAKAI (Ring opening polymerisation, p. 13 and following pages, published by K. C. FRISCH and S. REEGEN, MARCEL DEKKER 1969).

An examination of the cited works shows that one of the main problems posed by this type of condensation is the homopolymerisation of the epoxide which causes the obtaining of a sequent polyether-polyester or of polymer mixtures, particularly when LEWIS acids (TiCl$_4$, BF$_3$, etc.) are used as condensation catalysts. In order to overcome this drawback, it has been suggested in prior art to utilize anionic or coordination catalysts.

FISHER (Journal of Polymer Science 1960, Vol. 44, p. 155 and following pages) has shown that the use of a tertiary amine as a condensation catalyst of an anhydride on an epoxide allows to obtain an alternate condensation.

However, this type of catalyst is ineffective as far as maleic anhydride is concerned, probably because of the complex side reactions with the amines at the level of the double maleic bond. Other types of anionic catalysts such as alkali metal salts or tetra-alkylammonium salts have also been utilized. For example WADILL, MILLIGAN and PEPPEL (Industrial and Engineering Chemistry, Product Research and Development 1964, Vol. 3, Part 1, p. 53 and following pages) describe the use of lithium chloride in the presence of protonic materials at 150° C. These authors suggest that the homopolymerisation of epoxide is part of their process. As an example of a coordination catalyst, the dialkyl-zinc mentioned by INOUE et al. (Makromolekulare Chemie 1969, Vol. 126, p. 250 and following pages) can be cited: this type of catalyst can actually only be applied, according to INOUE et al., to phthalic anhydride.

Other catalysts, based on transition metals, have also been previously described. Thus, FISCHER (cited above) observes a partial homopolymerisation of the glycidic epoxide during its polycondensation with the phthalic anhydride in the presence of tetrabutyl titanate.

AKIMOTO (Journal of Polymer Science, Polymer Chemistry Edition, 1973, Vol. 11, p. 2247 and following pages) describes the copolymerisation of maleic anhydride with epichlorhydrin in the presence of acetylacetonates of transition metals, for example zinc diacetylacetonate which allows one to obtain an alternating copolymer with a relatively high yield and reaction velocity: on the other hand, titanium tetra-acetylacetonate is practically ineffective.

One of the problems which the present invention aims to solve is the obtaining of a copolymer with "hanging" chains showing a good alternation of the units of each type of compounds in the reaction.

Another problem which the present invention aims to solve is the use of a condensation catalyst that can be utilized with an anhydride such as maleic anhydride as well as with an anhydride such as phthalic anhydride.

DESCRIPTION OF THE INVENTION

It has been surprisingly discovered that it is possible to obtain, with a high conversion rate of the original materials and a sufficient reaction velocity, particularly in the case of an anhydride of the maleic anhydride type, an alternating polyester, by the condensation of at least one aliphatic epoxide having at least 8 atoms of carbon in its molecule on at least one cyclic anhydride of a dicarboxylic acid, by using as a condensation catalyst at least one titanium complex of general formula (I):

$$Ti(OR)_2(L)_2 \qquad (I)$$

in which each R group independently represents a hydrocarbon group with 1 to 10 atoms of carbon and each L group independently represents a ligand with the general formula (II):

(II)

in which:

R$^1$ and R$^2$ each represent, independently from one another, an atom of hydrogen, a hydrocarbon group with 1 to 10 atoms of carbon, substituted or not by at least one hetero-atom or by at least one hetero-atomic group.

R$^3$ represents an atom of hydrogen, a hydrocarbon group with 1 to 10 atoms of carbon, or a group of the general formula —O—R$^4$ in which R$^4$ represents a hydrocarbon group with 1 to 24 atoms of carbon.

In the complexes cited above of the general formula (I), each L group independently represents preferably a ligand of the general formula (II) in which:

R$^2$ represents an atom of hydrogen or an alkyl group with 1 to 6 atoms of carbon or most often 1 to 4 atoms of carbon;

R$^1$ and R$^3$, identical or different, represent each an alkyl group with 1 to 6 atoms of carbon or most often 1 to 4 atoms of carbon or $R^1$ represents an alkyl group selected among those cited above and $R^3$ represents a group of the general formula —O—$R^4$ in which $R^4$ preferably represents an alkyl group with 1 to 18 atoms of carbon and most often 1 to 12 atoms of carbon:
and in which each R group independently represents preferably an alkyl group with 1 to 6 atoms of carbon and most often an alkyl group with 1 to 4 atoms of carbon such as methyl, ethyl, n-propyl, isopropyl, n-butyl, isobutyl, tetriobutyl and methyl-1 propyl.

In a preferred embodiment of the invention, the complexes that are used are those in which the L groups are identical and in which the R groups are identical. these L and R groups being selected among the preferred groups cited above.

As non limitative examples of preferred L ligands, the following compounds can be cited; pentanedione-2,4; hexanedione-2,4; heptanedione-2,4; heptanedione-3,5; ethyl-3 pentanedione-2,4; methyl-5 hexanedione-2,4; octanedione-2,4; octanedione-3,5; dimethyl-5,5 hexanedione-2,4; methyl-6 heptanedione-2,4; dimethyl-2,2 nonanedione-3,5; dimethyl-2,6 heptanedione-3,5 and the methyl, ethyl, n-propyl, isopropyl, n-butyl, sec-butyl, isobutyl, tertiobutyl, isopentyl, n-hexyl, n-octyl, methyl-1 heptyl, n-nonyl, n-decyl and n-dodecyl esters of aceto-acetic acid.

The cyclic anhydride of a dicarboxylic acid which is used in the present invention is preferably an anhydride of a vicinal saturated or unsaturated, most often unsaturated, dicarboxylic acid. The cyclic anhydride that is utilized usually comprises 4 to 160 atoms of carbon and most often 4 to 90 atoms of carbon in its molecule.

Non limitative examples can be cited, such as maleic anhydride, alkylmaleic anhydrides such as for example citraconic or methylmaleic anhydride, halonenomaleic anhydrides such as for example chloromaleic and bromomaleic anhydrides, succinic anhydride, alkenylsuccinic anhydrides such as for example itaconic or methylene-succinic anhydride, n-octadecenylsuccinic anhydride and dodecenylsuccinic anhydride, polyalkenylsuccinic anhydrides with a usual average molecular weight ranging from about 200 to 3,000 and most often from about 250 to 2,000 (such as for example the polypropenylsuccinic anhydrides, particularly tetrapropenylsuccinic anhydride, and the polyisobutenylsuccinic anhydrides often called PIBSA), phthalic anhydride, phthalic anhydrides substituted by at least one atom of halogen and/or by at least one alkyl group, for example a lower alkyl group with 1 to 4 atoms of carbon, trimellitic anhydride, cyclohexanedicarboxylic-1,2 anhydride, the cyclohexanedicarboxylic-1,2 anhydrides substituted by at least one atom of halogen and/or by at least one alkyl group, for example a lower alkyl group with 1 to 4 atoms of carbon, nadic anhydride (bicyclo-[2.2.1] heptene-5 dicarboxylic-2,3) and the nadic anhydrides substituted by at least one atom of halogen and/or by at least one alkyl group, for example a lower alkyl group with 1 to 4 atoms of carbon. Other examples of a cyclic anhydride of a non vicinal dicarboxylic acid can also be cited, such as glutaric anhydride, the glutaric anhydrides substituted by at least one atom of halogen and/or by at least one alkyl group, for example a lower alkyl group with 1 to 4 atoms of carbon, glutaconic anhydride and the glutaconic anhydrides substituted by at least one atom of halogen and/or by at least one alkyl group, for example a lower alkyl group with 1 to 4 atoms of carbon.

The epoxide compound or aliphatic epoxide which is used in the scope of the present invention is a compound which usually has 8 to 62 atoms of carbon, preferably 8 to 40 atoms of carbon and most often 10 to 36 atoms of carbon in its molecule.

Within the scope of the present invention, it is preferable to use mono-epoxide compounds or mixtures of epoxide compounds usually comprising at least 80%, preferably at least 90% and for example at least 95% by mole of mono-epoxide compounds and containing compounds comprising several epoxide groups (oxirane cycle) in their molecule, for example 2 or 3 epoxide groups; the molar proportion of the poly-epoxide compounds in the mixture represents the 100% complement.

The aliphatic epoxide with at least 8 atoms of carbon in its molecule that is used in the present invention is usually a mono-epoxide compound corresponding to the general formula (III):

in which:

$R^4$ and $R^6$, identical or different, represent each an atom of hydrogen or an alkyl group with 1 to 4 atoms of carbon such as defined above;

$R^5$ and $R^7$, identical or different, represent each an atom of hydrogen, an alkyl group, preferably substantially linear, with 1 to 60 atoms of carbon, preferably 1 to 38 atoms of carbon, and more particularly 6 to 38 atoms of carbon, an alkoxyalkyl group of formula $R^8$—O—$R^9$— in which $R^8$ represents an alkyl group, preferably substantially linear, with 1 to 59 atoms of carbon, preferably 1 to 37 atoms of carbon and more particularly 1 to 25 atoms of carbon, and $R^9$ represents an alkylene group, preferably substantially linear, with 1 to 59 atoms of carbon, preferably 1 to 37 atoms of carbon, the sum of the atoms of carbon of $R^8$ and $R^9$ ranging usually from 6 to 60, preferably from 6 to 38 and more particularly from 8 to 34.

In formula (III) cited above, $R^5$ can also represent an alkoxylcarbonylalkylene group of formula:

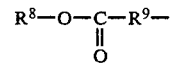

or an alkylcarbonyloxyalkylene group of formula:

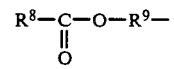

in which $R^8$ and $R^9$ have the definition given above.

The utilized aliphatic epoxide compound with at least 8 atoms of carbon in its molecule is thus described by general formula (III) in which at least one of groups $R^4$ to $R^7$ has at least 6 atoms of carbon.

The aliphatic mono-epoxide compounds which are used most often are those in which $R^4$ and $R^6$ represent each an atom of hydrogen and preferably those in which $R^4$, $R^6$ and $R^7$ represent each an atom of hydrogen.

As examples of preferred mono-epoxide compounds, compounds can be cited in which $R^4$, $R^6$ and $R^7$ represent each an atom of hydrogen and $R^5$ represents a substantially linear alkyl group with 6 to 38 atoms of carbon; a substantially linear alkoxyalkyl group of formula $R^8$—O—$R^9$—, an alkoxycarbonylalkylene group of formula:

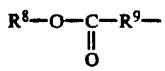

or an alkylcarbonyloxyalkylene group of formula:

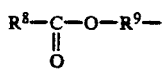

in which $R^8$ represents an alkyl group, substantially linear, with 1 to 37 atoms of carbon and preferably 1 to 25 atoms of carbon and $R^9$ represents an alkylene group, substantially linear, with 1 to 37 atoms of carbon and preferably 1 to 25 atoms of carbon, the sum of the atoms of carbon of $R^8$ and $R^9$ ranging from 6 to 38 and preferably from 8 to 34.

As specific examples of aliphatic mono-epoxide compounds, the following can be cited: epoxy-1,2 octane; epoxy-1,2 nonane; epoxy-1,2 decane; epoxy-1,2 undecane; epoxy-1,2 dodecane; epoxy-1,2 tetradecane; epoxy-1,2 pentadecane; epoxy-1,2 hexadecane; epoxy-1,2 heptadecane; epoxy-1,2 octadecane; epoxy-1,2 nonadecane; epoxy-1,2 eicosane; epoxy-1,2 docosane; epoxy-1,2 tetracosane; epoxy-1,2 hexacosane; the epoxy polybutenes with an average molecular weight ($\overline{Mn}$) ranging from about 100 to about 1,000; epoxy-2,3 octane; epoxy-3,4 octane; epoxy-3,4 decane; epoxy-9,10 octadecane; pentyloxy-3 epoxy-1,2 propane; hexyloxy-3 epoxy-1,2 propane; heptyloxy-3 epoxy-1,2 propane; octyloxy-3 epoxy-1,2 propane; decyloxy-3 epoxy-1,2 propane; dodecyloxy-3 epoxy-1,2 propane; decyloxy-3 epoxy-1,2 propane; dodecyloxy-3 epoxy-1,2 propane; lauroyloxy-1 epoxy-2,3 propane; myristoyloxy-3 epoxy-1,2 propane; palmitoyloxy-3 epoxy-1,2 propane; stearoyloxy-3 epoxy-1,2 propane; alkyl esters, for example methyl, ethyl, n-propyl, isopropyl, n-butyl, sec-butyl, isobutyl, tertiobutyl, ethyl-2 hexyl and hexadecyl esters of epoxy-3,4 nonanoic, epoxy-10,11 undecanoic, epoxy-6,7 octadecanoic, epoxy-12,13 octadecanoic, epoxy-11,12 octadecanoic, epoxy-9,10 octadecanoic, epoxy-11,12 eicosanoic and epoxy-13,14 docosanoic acids.

As specific examples of mixtures of epoxide compounds containing poly-epoxides, the mixture of alkyl esters obtained by esterification of a mixture of epoxy-acids resulting from the epoxidation of a mixture of ethylene-unsaturated fat acids can be cited.

The mixture of ethylene-unsaturated fat acids is for example a mixture comprising, in approximate proportions by weight given in Table I hereafter, acids having 12 to 20 atoms of carbon in their molecule and containing saturated and unsaturated acids; this mixture is usually called olein.

In Table I above, $C_{p.1}$ stands for acids comprising an ethylenic unsaturation, $C_{p.2}$ stands for acids comprising 2 ethylenic unsaturations and $C_{p.3}$ stands for acids with 3 ethylenic unsaturations (p is the number of atoms of carbon of the acid).

For the esterification of the epoxy-acid mixture, a mixture of alcohols can for example be used, which comprises, in approximate proportions by weight, about 95% of n-hexadecyl alcohol, 3% of n-octadecyl alcohol and 2% of alcohols with more than 18 atoms of carbon in their molecule.

The condensation between at least one aliphatic epoxide such as defined above and at least one cyclic anhydride of a dicarboxylic acid can be carried out in the presence or in the absence of a solvent. It is generally preferred to use a solvent such as, for example, a hydrocarbon solvent. The following non limitative examples of hydrocarbon solvents can be cited: benzene, toluene, xylene, ethylbenzene, cyclohexane, hexane or a mixture of hydrocarbons such as, for example, a hydrocarbon cut with a high boiling point such as a gas oil, a kerosine or the commercial SOLVESSO 150 cut (190°-209° C.) containing 99% by weight of aromatic compounds. It is also possible to use mixtures of solvents, for example a mixture of xylenes.

The condensation reaction is usually carried out at a temperature ranging from about 30° to about 200° C., preferably from about 40° to about 180° C. and for example from about 60° to about 150° C. It is generally operated under a normal pressure or under the pressure generated by the mixture constituents, but it is possible to operate under a higher pressure.

The condensation between the cyclic anhydride and the epoxide is generally performed by using such amounts of each of these two compounds that the molar ratio epoxide/cyclic anhydride ranges from about 0.5:1 to about 2:1, preferably from about 0.7:1 to about 1.3:1 and for example from about 0.9:1 to about 1.1:1.

The reaction duration usually ranges from about 1 hour to about 24 hours and for example from about 2 to about 12 hours. This duration preferably corresponds, within the selected conditions, to the practically total disappearing of one of the reagents (epoxide or anhydride) utilized in the reaction.

The titanium-based catalyst can be added to the mixture of epoxide and anhydride either in the solid or liquid form, or in the diluted form (solution or dispersion) in a solvent that is usually the same as that which has been used for the condensation.

The amount of titanium-based catalyst that is utilized, expressed in gram-atom of titanium for 100 moles of epoxide, usually ranges from about 0.05 to about 5%, and preferably from about 0.1 to about 2%.

The polyester from the condensation according to the invention is a compound which usually shows an average molecular weight ranging from about 400 to about 50,000, and the units of which, derived from the epoxide and the anhydride, are regularly alternating. Besides, the use of the titanium complexes of the present invention allows one to very highly decrease the homopolymerization of the epoxide in relation to that which is obtained by using a tetra-alkyl titanate such as, for example, tetrabutyl titanate, while keeping a high reaction velocity, which also allows one to obtain, under

TABLE I

| ACIDS | $C_{12}$* | $C_{14}$* | $C_{14.1}$ | $C_{15}$* | $C_{16}$* | $C_{16.1}$ | $C_{17.1}$ | $C_{18}$* | $C_{18.1}$ | $C_{18.2}$ | $C_{18.3}$ | $C_{20.1}$ |
|---|---|---|---|---|---|---|---|---|---|---|---|---|
| % wt. | 0.8 | 2.7 | 1.0 | 0.5 | 5.0 | 5.5 | 1.5 | 1.5 | 68.0 | 10.0 | 2.5 | 1.0 |

*saturated acids iso-conditions, a relatively high conversion rate of the original products, as shown in the following examples.

BRIEF DESCRIPTION OF DRAWINGS

FIGS. 1, 2, 3 and 4 are all graphs showing the percentage conversion of the starting constituents as a function of time, which Figs. are further discussed in the examples.

These examples illustrate the invention without limiting the scope thereof. Example 4 is given as a comparison.

EXAMPLE 1

(14.7 g) 0.15 mole of maleic anhydride, (27.6 g) 0.15 mole of epoxy-1,2 dodecane, 7.4 g of phenyldodecane, 17.6 g of toluene and (0.64 g) $1.5 \times 10^{-3}$ mole of a titanium complex with the general formula (I) defined above and in which each R group represents an isopropyl group and each L group represents the ethyl ester of aceto-acetic acid (this titanium compound is a commercial product which is for example sold by the TIOXIDE UK Limited company) are introduced into a 100 ml-reactor equipped with a stirring system and a temperature regulation system.

Figure 1:
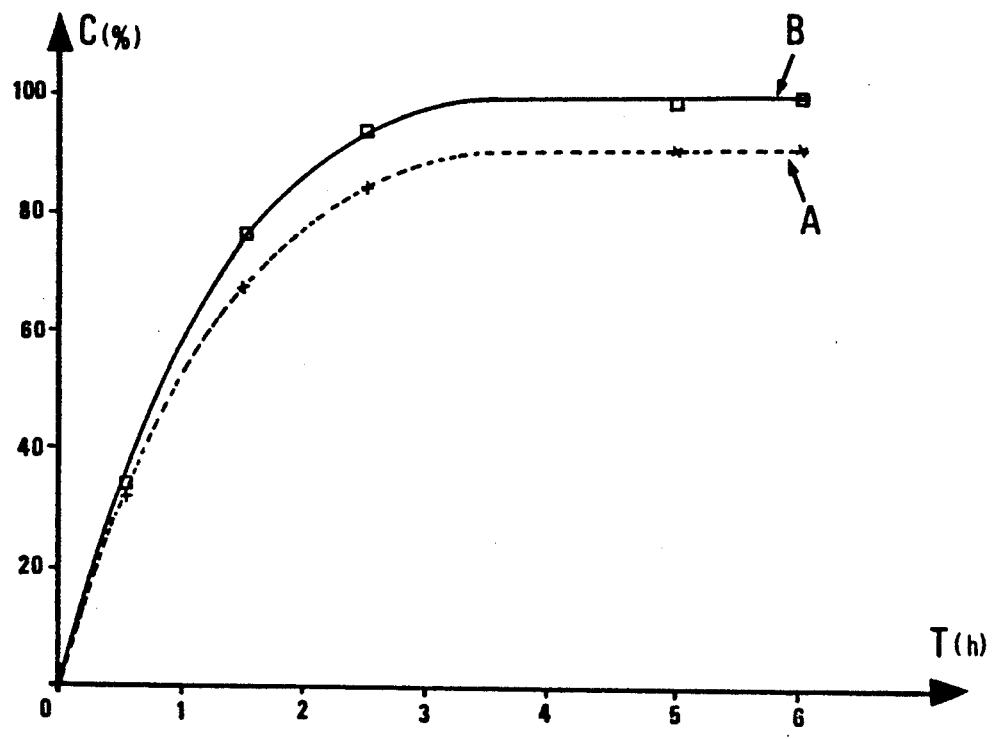

The mixture obtained in the reactor is brought to 100° C. and maintained at this temperature for 6 hours under constant stirring. The reaction is followed by infrared spectrometry (IR) and by Gel Permeation Chromatography (GPC). With the infrared spectrometry, the appearing of an ester band at 1,730 cm$^{-1}$ and the disappearing of the carbonyl bands of the maleic anhydride at 1,770 cm$^{-1}$ and 1,840 cm$^{-1}$ can be observed. FIG. 1 shows the conversion percentage for each constituent in relation to time in hour (GPC measurement: the phenyldodecane that is present in the reaction medium is used as an internal standard). Curve A relates to the maleic anhydride and curve B to the epoxy-1,2 dodecane. After a 6 hour-reaction at 100° C., the epoxide conversion rate is 100% and that of the maleic anhydride is 92%. The average molecular weight of the obtained polyester, in relation to a polystyrene calibration, is 5,000. FIG. 1 shows that the epoxide and anhydride conversions are substantially equal at any time, particularly during the first 2 hours of the reaction, which allows to conclude that the formed polymer is perfectly alternating.

The homopolymerization of epoxide is low: it is under 10% after the 6 hour-reaction.

EXAMPLE 2

It is carried out under the same conditions as in example 1, but a titanium complex of the general formula (I) defined above, and in which each R group represents a n-butyl group and each L group represents acetylacetone (pentanedione-2,4) is used.

Figure 2:
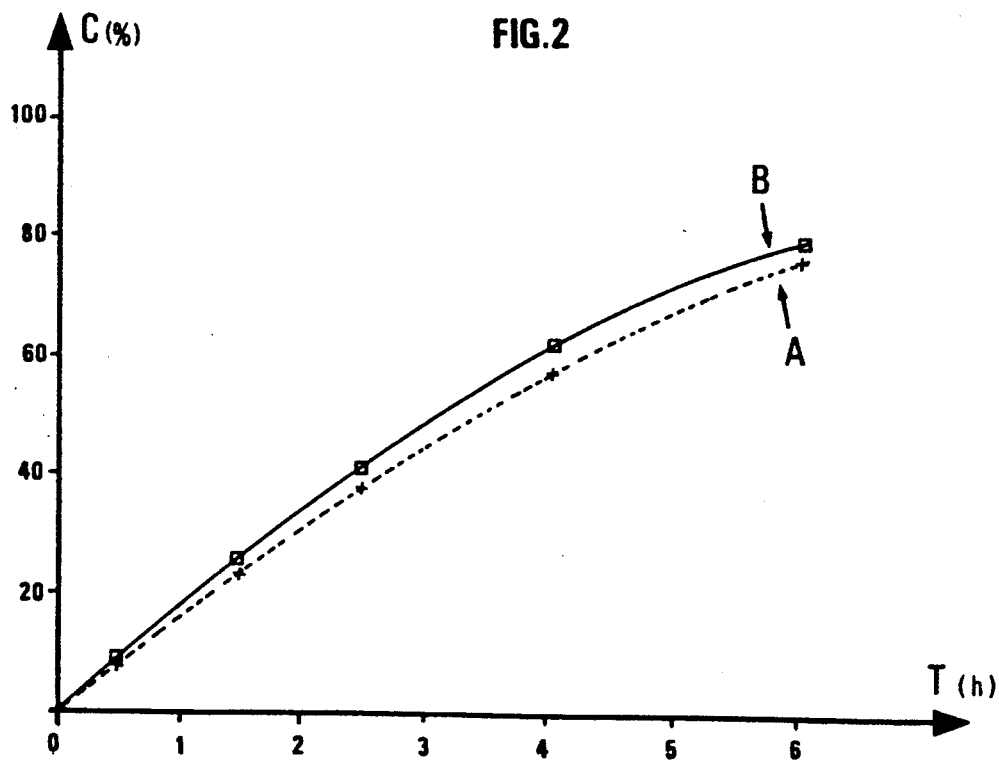

After a 6 hour-reaction at 100° C., the conversion rate of the epoxide is 79% and that of the maleic anhydride is 77%. FIG. 2 shows the conversion percentage of each constituent in relation to time in hour (GPC measurement: the phenyldodecane that is present in the reaction medium is used as an internal standard). Curve A relates to maleic anhydride and curve B to epoxy-1,2 dodecane. FIG. 2 shows that the conversion rates of epoxide and anhydride are substantially equal at any time, which allows to conclude that the formed polymer is perfectly alternating.

EXAMPLE 3

Example 1 is repeated, but the titanium complex that is used is a compound of the general formula (I) defined above, in which each R group represents an isopropyl group and each L group represents acetylacetone (pentanedione-2,4). After a 6 hour-reaction at 100° C., the epoxide conversion rate is 99% and that of the maleic anhydride is 94%. FIG. 3 shows the conversion percentage for each constituent in relation to time in hour (GPC measurement: the phenyldodecane that is present in the reaction medium is used as an internal standard). Curve A relates to the maleic anhydride and curve B relates to epoxy-1,2 dodecane. FIG. 3 shows that the conversions rates of epoxide and anhydride are substantially equal at any time, particularly during the first reaction hours, which allows one to conclude that the formed polymer is perfectly alternating.

EXAMPLE 4

It is carried out under the same conditions as in example 3, but by introducing into the reaction mixture 0.92 ml of a solution in the toluene of 50% by weight of tetrabutyl titanate with the formula $Ti(OC_4H_9)_4$ ($1.5 \times 10^{-3}$ mole) as a titanium-based catalyst. FIG. 4 shows the conversion percentage of each constituent in relation to time in hour (GPC measurement: the phenyldodecane that is present in the reaction medium is used as an internal standard). Curve A relates to maleic anhydride and curve B relates to epoxy-1,2 dodecane. FIG. 4 shows that the conversion rate of the epoxide is faster than that of the anhydride as soon as the beginning of the reaction. The obtained polymer is not a perfectly alternating polymer. The homopolymerisation of the epoxide is rather high and it widely exceeds 20% after the 6-hour reaction at 80° C.

EXAMPLE 5

Example 3 is repeated, but the epoxy-1,2 dodecane is replaced by the ethyl-2 hexylic ester of the epoxy-9,10 octadecanoic acid. After a 6 hour-reaction at 100° C., the conversion rate of the epoxide is 64% and that of the maleic anhydride is 59%.

We claim:

1. A process for condensing at least one aliphatic epoxide with at least 8 atoms of carbon in its molecule on at least one cyclic anhydride of a dicarboxylic acid in the presence of a catalyst consisting essentially of at least one titanium complex of the general formula (I):

$$Ti(OR)_2(L)_2 \qquad (I)$$

in which each R group independently represents a hydrocarbon group with 1 to 10 atoms of carbon and each L group independently represents a ligand of the general formula (II):

(II)

in which:

R$^1$ and R$^2$ represent each, independently from one another, an atom of hydrogen, a hydrocarbon group with 1 to 10 atoms of carbon, substituted or not by at least one hetero-atom or by at least one hetero-atomic group.

$R^3$ represents an atom of hydrogen, a hydrocarbon group with 1 to 10 atoms of carbon, or a group of the general formula $-O-R^4$ in which $R^4$ represents a hydrocarbon group with 1 to 24 atoms of carbon.

2. A process according to claim 1 wherein said titanium complex corresponds to the general formula (I) in which each L group independently represents a ligand of the general formula (II) in which:

$R^2$ represents an atom of hydrogen or an alkyl group with 1 to 6 atoms of carbon, $R^1$ and $R^3$, identical or different, represent each an alkyl group with 1 to 6 atoms of carbon.

3. A process according to claim 1 wherein said titanium complex corresponds to the general formula (I) in which each of the L groups, identical, represents a ligand of the general formula (II) selected from the following compounds: pentanedione-2,4; hexanedione-2,4; heptanedione-2,4; heptanedione-3,5; ethyl-3 pentanedione-2,4; methyl-5 hexanedione-2,4; octanedione-2,4; octanedione-3,5; dimethyl-5,5 hexanedione-2,4; methyl-6 heptanedione-2,4; dimethyl-2,2 nonanedione-3,5 and dimethyl-2,6 heptanedione-3,5.

4. A process according to claim 1 wherein said titanium complex corresponds to the general formula (I) in which each L group independantly represents a ligand of the general formula (II) in which:

$R^2$ represents an atom of hydrogen or an alkyl group with 1 to 6 atoms of carbon, $R^1$ represents an alkyl group with 1 to 6 atoms of carbon, and $R^3$ represents a group of the general formula $-O-R^4$ in which $R^4$ represents an alkyl group with 1 to 18 atoms of carbon.

5. A process according to claim 1 wherein said titanium complex corresponds to the general formula (I) in which each of the L groups, identical, represents a ligand of the general formula (II) selected from the following compounds: the methyl, ethyl, n-propyl, isopropyl, n-butyl, sec-butyl, isobutyl, tertiobutyl, isopentyl, n-hexyl, n-octyl, methyl-1 heptyl, n-nonyl, n-decyl, and n-dodecyl esters of aceto-acetic acid.

6. A process according to claim 1 wherein said titanium complex corresponds to the general formula (I) in which each R group independently represents an alkyl group with 1 to 6 atoms of carbon.

7. A process for condensing at least one aliphatic epoxide on at least one cyclic anhydride of a dicarboxylic acid according to claim 1 wherein said anhydride is an anhydride of a saturated or unsaturated vicinal dicarboxylic acid.

8. A process according to claim 1 wherein the cyclic anhydride of a dicarboxylic acid is selected from the following compounds: maleic anhydride, citraconic anhydride, halogenomaleic anhydrides, succinic anhydride, alkenylsuccinic or polyalkenylsuccinic anhydrides, phthalic anhydride, phthalic anhydrides substituted by at least one atom of halogen and/or at least one alkyl group, trimellitic anhydride, cyclohexanedicarboxylic-1,2 anhydride, cyclohexanedicarboxylic-1,2 anhydrides substituted by at least one atom of halogen and/or at least one alkyl group, nadic anhydride, nadic anhydrides substituted by at least one atom of halogen and/or at least one alkyl group, glutaric anhydride, glutaric anhydrides substituted by at least one atom of halogen and/or at least one alkyl group, glutaconic anhydride and glutaconic anhydrides substituted by at least one atom of halogen and/or at least one alkyl group.

9. A process according to claim 1 wherein the aliphatic epoxide with at least 8 atoms of carbon in its molecule is selected from the epoxides of the general formula (III):

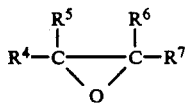

in which:

$R^4$ and $R^6$, identical or different, represent each an atom of hydrogen or an alkyl group with 1 to 4 atoms of carbon, $R^5$ and $R^7$, identical or different, represent each an atom of hydrogen, an alkyl group with 1 to 60 atoms of carbon, an alkoxyalkyl group of formula $R^8-O-R^9$ in which $R^8$ represents an alkyl group with 1 to 59 atoms of carbon and $R^9$ represents an alkylene group with 1 to 59 atoms of carbon, $R^5$ can also represent an alkoxycarbonylalkylene group of the formula:

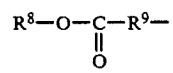

or an alkylcarbonyloxyalkylene group of the formula:

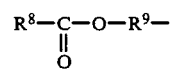

in which $R^8$ and $R^9$ have the definition given above and at least one of groups $R^4$ to $R^7$ has at least 6 atoms of carbon.

10. A process according to claim 1 wherein the aliphatic epoxide with at least 8 atoms of carbon in its molecule is selected from the following epoxides or epoxide groups: epoxy-1,2; undecane; epoxy-1,2 undecane; epoxy-1,2 dodecane; epoxy-1,2 tetradecane; epoxy-1,2 pentadecane; epoxy-1,2 hexadecane; epoxy-1,2 heptadecane; epoxy-1,2 octadecane; epoxy-1,2 tetracosane; epoxy-1,2 hexacosane; the epoxy polybutenes with an average molecular weight ($\overline{Mn}$) ranging from about 100 to about 1,000; epoxy-2,3 octane; epoxy-3,4 octane; epoxy-3,4 decane; epoxy-9,10 octadecane; pentyloxy-3 epoxy-1,2 propane; hexylloxy-3 epoxy-1,2 propane; octyloxy-3 epoxy-1,2 propane; decyloxy-3 epoxy-1,2 propane; dodecyloxy-3 epoxy-1,2 propane; lauroyloxy-1 epoxy-2,3 propane; myristoyloxy-3 epoxy-1,2 propane; palmitoyloxy-3 epoxy-1,2 propane; stearoyloxy-3 epoxy-1,2 propane; the alkylic esters such as the methyl, ethyl, n-propyl, n-buty, sec-butyl, iso-butyl, tertiobutyl ethyl-2-hexyl and hexadecyl esters of the epoxy-3,4 nonanoic, epoxy-10,11 undecanoic, epoxy-6,7 octadecanoic, epoxy-12,13 octadecanoic, epoxy-11,12 octadecanoic, epoxy-9,10 octadecanoic, epoxy-11,12 eicosanoic and epoxy-13,14 docosanoic acids.

11. A process according to claim 1, wherein R represents alkyl of 1–4 carbon atoms.

12. A process according to claim 2, wherein said titanium complex corresponds to the general formula (I) in which each R group independently represents an alkyl group with 1 to 6 atoms of carbon.

13. A process according to claim 3, wherein said titanium complex corresponds to the general formula (I) in which each R group independently represents an alkyl group with 1 to 6 atoms of carbon.

14. A process according to claim 4, wherein said titanium complex corresponds to the general formula (I) in which each R group independently represents an alkyl group with 1 to 6 atoms of carbon.

15. A process according to claim 5, wherein said titanium complex corresponds to the general formula (I) in which each R group independently represents an alkyl group with 1 to 6 atoms of carbon.

16. A process according to claim 2, wherein R represents alkyl of 1–4 carbon atoms.

17. A process according to claim 3, wherein R represents alkyl of 1–4 carbon atoms.

18. A process according to claim 4, wherein R represents alkyl of 1–4 carbon atoms.

19. A process according to claim 5, wherein R represents alkyl of 1–4 carbon atoms.

* * * * *